(12) United States Patent
Skroski et al.

(10) Patent No.: US 11,955,667 B2
(45) Date of Patent: Apr. 9, 2024

(54) SYSTEM AND METHOD FOR A BATTERY ASSEMBLY

(71) Applicant: BETA AIR, LLC, South Burlington, VT (US)

(72) Inventors: Tyler Skroski, Burlington, VT (US); Stuart Denson Schreiber, Essex, VT (US)

(73) Assignee: BETA Air, LLC, South Burlington, VT (US)

( * ) Notice: Subject to any disclaimer, the term of this patent is extended or adjusted under 35 U.S.C. 154(b) by 0 days.

(21) Appl. No.: 17/983,775

(22) Filed: Nov. 9, 2022

(65) Prior Publication Data

US 2023/0155263 A1 May 18, 2023

Related U.S. Application Data

(60) Provisional application No. 63/279,444, filed on Nov. 15, 2021, provisional application No. 63/279,465, filed on Nov. 15, 2021.

(51) Int. Cl.
*H01M 50/60* (2021.01)
*H01M 10/04* (2006.01)
(Continued)

(52) U.S. Cl.
CPC ..... *H01M 50/668* (2021.01); *H01M 10/0481* (2013.01); *H01M 10/647* (2015.04); *H01M 50/249* (2021.01); *H01M 50/44* (2021.01); *H01M 10/0525* (2013.01); *H01M 10/625* (2015.04); *H01M 10/653* (2015.04);
(Continued)

(58) Field of Classification Search
CPC ............. H01M 50/668; H01M 10/647; H01M 50/249; H01M 50/44; H01M 10/0481; H01M 2220/20; H01M 10/0525; H01M 10/625; H01M 10/653; H01M 50/124; H01M 50/209; H01M 50/211; H01M 50/213; H01M 50/231; H01M 50/24; H01M 50/293; Y02E 60/10
See application file for complete search history.

(56) References Cited

U.S. PATENT DOCUMENTS 8,409,744 B2 4/2013 Ijaz et al.
9,005,790 B2 4/2015 Park et al.
(Continued)

FOREIGN PATENT DOCUMENTS

DE 202016006076 U1 12/2016
WO 2013075904 5/2013
WO 2021144758 7/2021

OTHER PUBLICATIONS

N/A, Battery Cases for Electric Cars, Aug. 31, 2021.
N/A, H1PERBAT Future proofing battery case design for electric vehicles, Aug. 31, 2021.

*Primary Examiner* — Lingwen R Zeng
(74) *Attorney, Agent, or Firm* — Hoffman Warnick LLC (57) ABSTRACT

A battery pack assembly including at least a battery cell, wherein the battery cell may include a pair of electrodes, a pair of conductive foil tabs and an electrolyte. The battery pack assembly may include a battery cell case, wherein the battery cell case is configured to surround a portion of the a battery cell. The battery cell case may include a layer, wherein the layer may be configured to provide a pressure against a battery cell.

20 Claims, 5 Drawing Sheets

(51) Int. Cl.
  H01M 10/647 (2014.01)
  H01M 50/249 (2021.01)
  H01M 50/44 (2021.01)
  H01M 10/0525 (2010.01)
  H01M 10/625 (2014.01)
  H01M 10/653 (2014.01)
  H01M 50/124 (2021.01)
  H01M 50/209 (2021.01)
  H01M 50/211 (2021.01)
  H01M 50/213 (2021.01)
  H01M 50/231 (2021.01)
  H01M 50/24 (2021.01)
  H01M 50/293 (2021.01)

(52) U.S. Cl.
  CPC ........ *H01M 50/124* (2021.01); *H01M 50/209* (2021.01); *H01M 50/211* (2021.01); *H01M 50/213* (2021.01); *H01M 50/231* (2021.01); *H01M 50/24* (2021.01); *H01M 50/293* (2021.01); *H01M 2220/20* (2013.01); *Y02E 60/10* (2013.01)

(56) References Cited

U.S. PATENT DOCUMENTS

| | | | |
|---|---|---|---|
| 9,853,263 B2 | 12/2017 | Baek et al. | |
| 10,193,135 B2 | 1/2019 | Sharma et al. | |
| 2007/0141452 A1* | 6/2007 | Kim | H01M 10/6551 429/66 |
| 2012/0094163 A1 | 4/2012 | Fuller | |
| 2012/0225331 A1 | 9/2012 | Tartaglia | |
| 2012/0280692 A1* | 11/2012 | Park | G01R 31/68 324/426 |
| 2013/0078493 A1* | 3/2013 | Chen | H01M 50/105 429/96 |
| 2013/0236753 A1* | 9/2013 | Yue | B82Y 30/00 165/185 |
| 2020/0251791 A1* | 8/2020 | Li | H01M 10/647 |
| 2020/0274156 A1 | 8/2020 | Wang et al. | |
| 2020/0377186 A1 | 12/2020 | Thompson et al. | |

\* cited by examiner

SYSTEM AND METHOD FOR A BATTERY ASSEMBLY

CROSS-REFERENCE TO RELATED APPLICATIONS

This application is claiming the benefit of priority of U.S. Provisional Application No. 63/279,444 filed on Nov. 15, 2021 and entitled "SYSTEM AND METHOD FOR A BATTERY ASSEMBLY" and U.S. Provisional Application No. 63/279,465 filed on Nov. 15, 2021 and entitled "SYSTEM AND METHOD FOR A BATTERY ASSEMBLY." Each of U.S. Patent Application Ser. No. 63/279,444 and U.S. Patent Application Ser. No. 63/279,465 are incorporated by reference herein in its entirety.

FIELD OF THE INVENTION

The present invention generally relates to the field of battery assemblies. In particular, the present invention is directed to a system and method for battery assemblies for use in electric aircraft.

BACKGROUND

Electric aircraft require batteries to operate. Electric aircraft may use pouch cells to operate. However, batteries are prone to overheating and take up space. Also, batteries can undergo a harmful process called thermal runaway. Efficiency and safety of batteries are crucial. As such, current systems and methods of battery assemblies are not sufficient and can be improved.

SUMMARY OF THE DISCLOSURE

In an aspect, a system and method for a battery pack assembly is presented. The battery pack assembly may include at least a battery cell, wherein the battery cell may include a pair of electrodes, a pair of conductive foil tabs and an electrolyte. The battery pack assembly may include a battery cell case, wherein the battery cell case is configured to surround at least a portion of the at least a battery cell, wherein the battery cell case may include a layer, wherein the layer is configured to provide a pressure against the at least a battery cell.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Figure 1:
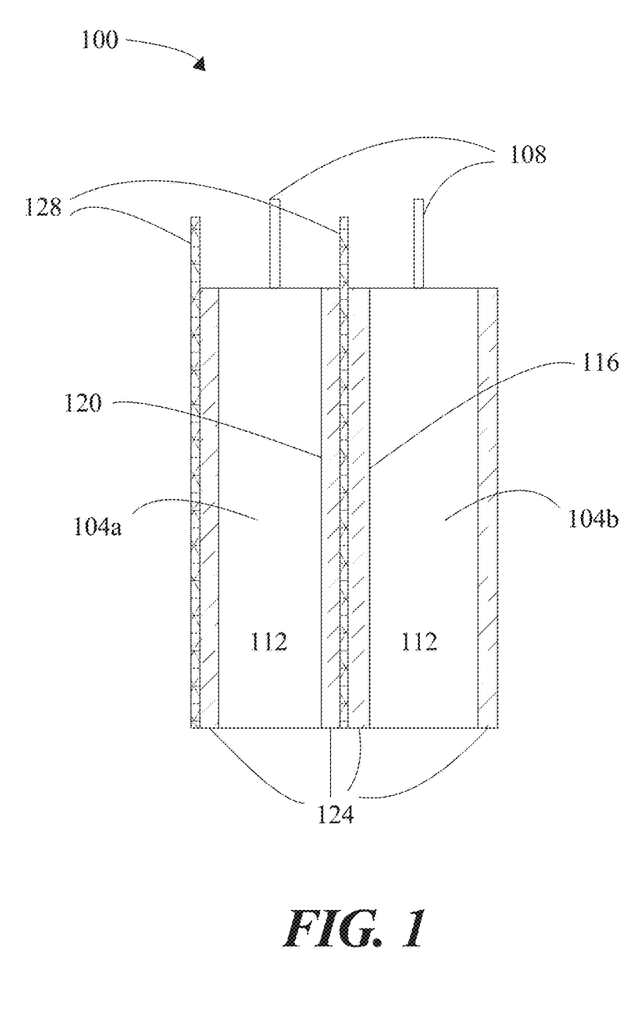
FIG. 1 illustrates an exemplary embodiment of a cross section of a portion of a battery assembly.

Described herein is a system and method for a battery pack assembly. A battery pack assembly may be configured for use in an electric aircraft. The battery pack assembly may include at least a battery cell, wherein the battery cell may include a pair of electrodes, a pair of conductive foil tabs and an electrolyte. The battery pack assembly may include a battery cell case, wherein the battery cell case is configured to surround at least a portion of the at least a battery cell, wherein the battery cell case may include a layer, wherein the layer is configured to provide a pressure against the at least a battery cell. Referring now to FIG. 1, a cross section of an exemplary embodiment of a portion of battery assembly 100 is illustrated. As used in this disclosure, "battery assembly" is an assembly of battery cells. In some embodiments, battery assembly 100 may include at least a battery cell. In some embodiments, battery assembly 100 may include a plurality of the at least a battery cell. As a non-limiting example, the plurality of the at least a battery cell may include first pouch cell 104a and second pouch cell 104b. In some embodiments, the at least a battery cell may include a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. In some embodiments, the at least a battery cell may include lead-based batteries such as without limitation lead acid batteries and lead carbon batteries. In some embodiments, the at least a battery cell may include lithium sulfur batteries, magnesium ion batteries, and/or sodium ion batteries. In some embodiments, the at least a battery cell may include solid state batteries or supercapacitors or another suitable energy source. In another non-limiting embodiment, the at least a battery cell may include an electrochemical reaction configured to produce electrical energy. For example and without limitation, the electrical energy produced by pouch cell may be sufficient to power at least a portion of an electric vehicle, such as without limitation an electric motor of an eVTOL aircraft. In some embodiments, the at least a battery cell may include electrochemical cells, galvanic cells, electrolytic cells, fuel cells, flow cells, voltaic cells, and/or any combination thereof.

Still referring to FIG. 1, in some embodiments, at least a battery cell may include a pouch cell 104. As used in this disclosure, "pouch cell" is a battery cell with a pouch. In some embodiments, pouch cell 104 may include a pair of electrodes. As used in this disclosure, an "electrode" is an electrical conductor. The pair of electrodes may include an electrically conductive element. Non-limiting exemplary electrically conductive elements may include braided wire, solid wire, metallic foil, circuitry, such as printed circuit boards, and the like. In some embodiments, pouch cell 104 may include conductive foil tab 108. As used in this disclosure, a "conductive foil tab" is a any protruding component capable of carrying a current. In some embodiments, pouch cell 104 may include a pair of conductive foil tabs 108. In some embodiments, the pair of electrodes may be in electric communication with the pair of conductive foil tabs 108. As used in this disclosure, "communication" is an attribute wherein two or more relate interact with one another, for example within a specific domain or in a certain manner. As used in this disclosure, "electric communication" is an attribute. The pair of electrodes may be bonded with at least a pair of conductive foil tabs 108 by any known method, including without limitation welding, brazing, soldering, adhering, engineering fits, electrical connectors, and the like. In some cases, the pair of conductive foil tabs 108 may include a cathode and an anode. As used in this disclosure, a "cathode" is a type of electrode that acquires electrons from an external circuit and is reduced during the electrochemical reaction. As used in this disclosure, an "anode" is a type of electrode that releases electrons to an external circuit and oxidizes during and electrochemical reaction. In some cases, an exemplary cathode may include a lithium-based substance, such as lithium-metal oxide, bonded to an aluminum tab. In some cases, an exemplary anode may include a carbon-based substance, such as graphite, bonded to a copper tab. In some embodiments, the pair of conductive foil tabs 108 may be configured to electrically connect with a bus bar. For the purposes of this disclosure, a "bus bar" or a "bus" is an electrically conductive pathway connecting at least a component in a system configured to convey electrical energy between components. The bus bar may include one or more electrically conductive pathways configured to transfer electrical energy across the pathways to convey electrical energy from one component to one or more other components. Additionally without limitation, a bus disclosed herein may be consistent with a bus disclosed in U.S. patent application Ser. No. 17/983,721, filed on Nov. 9, 2022, entitled as "BATTERY PACK FOR AN ELECTRIC AIRCRAFT," which is incorporated in its entirety herein by reference.

Still referring to FIG. 1, in some embodiments, pouch cell 104 may include an insulator layer. As used in this disclosure, an "insulator layer" is an electrically insulating material that is substantially permeable to battery ions, such as without limitation lithium ions. In some cases, the insulator layer may be referred to as a separator layer or simply separator. In some cases, the insulator layer may be included and configured to prevent electrical communication directly between a pair of foil conductive foil tabs 108 (e.g., cathode and anode). In some cases, the insulator layer may be configured to allow for a flow of ions across it. In some embodiments, the insulator layer may consist of a polymer, for example polyolefin (PO). In some embodiments, the insulator layer may include pours which are configured to allow for passage of ions, for example lithium ions. In some cases, pours of a PO insulator layer may have a width no greater than 100 μm, 10 μm, or 0.1 μm. In some cases, a PO insulator layer may have a thickness within a range of 1-100 μm, or 10-30 μm.

Still referring to FIG. 1, in some embodiments, pouch cell 104 may include pouch 112. As used in this disclosure, a "pouch" is an object that encompasses at least the electrolyte of a pouch battery cell. In some embodiments, pouch may encompass an electrode, an electrolyte, an insulative layer, and the like. In some embodiments, the pouch may be made of a metal, such as aluminum. In some embodiments, the pouch may be made of a polymer, such as polypropylene, polyamide, or polybutylene terephthalate, for example. In some embodiments, pouch 112 may include a layer of metal sandwiched between two pieces of polymer. As an example, pouch 112 may include a piece of aluminum sandwiched between a layer of polypropylene and a layer of polyamide. In some embodiments, pouch cell 104 may include or be referred to as a prismatic pouch cell, for example when an overall shape of the pouch is prismatic. In some embodiments, pouch cell 104 may include pouch 112 which is substantially flexible. Alternatively or additionally, in some embodiments, pouch 112 may be substantially rigid. In some embodiments, the pouch may be configured to substantially encompass a pair of foil conductive foil tabs 108 and a portion of an insulator layer. In an embodiment, and without limitation, pouch 112 may be coated with one or more coatings. For example, in some cases, pouch 112 may have an outer surface coated with a metalizing coating, such as an aluminum or nickel containing coating. In some cases, pouch 112 coating may be configured to electrically ground and/or isolate pouch 112, increase pouches impermeability, increase pouches resistance to heat, increases pouches thermal resistance (insulation), and the like.

Still referring to FIG. 1, in some embodiments, pouch cell 104 may include a first side of pouch cell 104. In some embodiments, the first side of pouch cell 104 may include a pair of conductive foil tabs 108. In some embodiments, the first side of pouch cell 104 may include a seal. In an embodiment, seal may seal the entire surface of first side of pouch cell 104. In another embodiment, seal may seal a portion of first side of pouch cell 104 while a portion of a pair of foil conductive foil tabs 108 emanating from seal. In some embodiments, seal may seal a portion of the pair of foil conductive foil tabs 108. As a non-limiting example, seal may encompass a portion of the pair of foil conductive foil tabs 108, while seal allow a portion of the pair of foil conductive foil tabs 108 that is not sealed to electrically connect with a bus.

As used in this disclosure, a "seal" is a material that prevents any substance passing through the material. As a non-limiting example, the substance may include air, liquid, solid, gel, current, temperature, and/or the like. As another non-limiting example, the substance may include cell ejecta from pouch cell 104 during a thermal runaway. As used in this disclosure, "cell ejecta" is any material that has been ejected, for example from pouch cell 104. In some cases, the cell ejecta may be ejected during a thermal runaway of pouch cell 104. Alternatively or additionally, in some cases, the cell ejecta may be ejected without the thermal runaway of pouch cell 104. In some cases, the cell ejecta may include lithium-based compounds. Alternatively or additionally, the cell ejecta may include carbon-based compounds, such as without limitation carbonate esters. The cell ejecta may include matter in any phase or form, including solid, liquid, gas, vapor, and the like. In some cases, the cell ejecta may undergo a phase change, for example the cell ejecta may be vaporous as it is initially being ejected and then cool and condense into a solid or liquid after ejection. Additionally without limitation, more disclosures related to the pair of conductive foil tabs of pouch battery cell may be found in U.S. patent application Ser. No. 17/839,887, filed in Jun. 14, 2022, entitled as "BATTERY PACK FOR A CARBON FIBER POUCH CELL CASING CONFIGURED TO COOL BATTERY CELLS," which is incorporated in its entirety herein by reference. Additionally without limitation, more disclosure related to the first side of pouch cell may be found in U.S. patent application Ser. No. 17/983,721, filed on Nov. 9, 2022, entitled as "BATTERY PACK FOR AN ELECTRIC AIRCRAFT," which is incorporated in its entirety herein by reference. Additionally without limitation, more disclosures related to a seal of a pouch battery cell may be found in U.S. patent application Ser. No. 17/983,721, filed on Nov. 9, 2022, entitled as "BATTERY PACK FOR AN ELECTRIC AIRCRAFT," which is incorporated in its entirety herein by reference.

Still referring to FIG. 1, as used in this disclosure, a "thermal runaway" is a phenomenon in which a battery cell enters an uncontrollable, self-heating state. In some embodiments, the thermal runaway may occur when pouch cell 104 develops lower resistances or lower triggering voltages as the internal temperature increases. In some embodiments, as current flow gets markedly increased, increased power dissipation may raise the temperature further. As a non-limiting example, during the thermal runaway, the temperature of pouch cell 104 may increase up to 1000° C., 1200° C., 1600° C., 1800° C., or the like. In some embodiments, the temperature of pouch cell 104 may be less than 1000° C. "Temperature," as used in this disclosure, and as would be appreciated by someone of ordinary skill in the art, is a measure of the heat energy of a system. In some embodiments the temperature may be measured in Fahrenheit (° F.), Celsius (° C.), Kelvin (° K), or another scale alone or in combination.

Still referring to FIG. 1, in some embodiments, during a thermal runaway, a pressure of pouch cell 104 may increase. As used in this disclosure, "pressure" is the force applied perpendicular to the surface of an object per unit area over which that force is distributed. In some embodiments, the pressure may be measured in pascal (Pa), pound-force per square inch (psi), standard atmospheric pressure (atm), torr, manometric units such as without limitation centimetre of water, millimeter of mercury, inch of mercury, and the like. In some embodiments, as the pressure of pouch cell 104 increases, a pressure difference between pouch cell 104 and outside of pouch cell 104 may increase. As used in this disclosure, "pressure difference" is a difference in pressure between two different points. As a non-limiting example, the two different points may be inside of pouch cell 104 and the outside of pouch cell 104. In some embodiments, the pressure of the inside of pouch cell 104 may be 80 psi. In an embodiment, the pressure of the inside of pouch cell 104 may be greater than 80 psi. In another embodiment, the pressure of the inside of pouch cell 104 may be less than 80 psi. In an embodiment, the pressure of the outside of pouch cell 104 may be greater than the pressure of the inside of pouch cell 104. In another embodiment, the pressure of the outside of pouch cell 104 may be less than the pressure of the inside of pouch cell 104. As a non-limiting example, during the thermal runaway, the pressure difference between the inside of pouch cell 104 and the outside of pouch cell 104 may be 20 psi, 40 psi, 80 psi, 120 psi, 200 psi, or the like, wherein the pressure of the inside of pouch cell 104 is greater than the pressure of the outside of pouch cell 104.

Figure 2A:
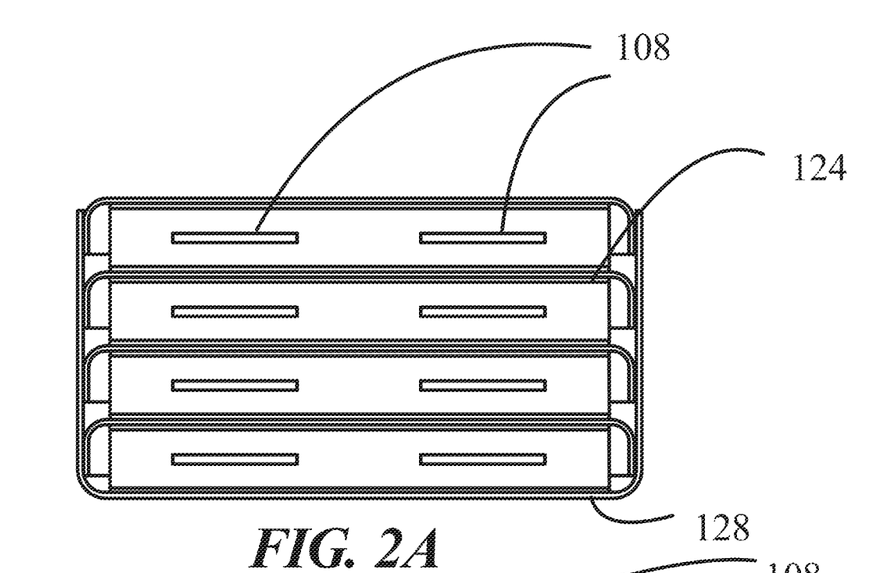
FIGS. 2A-B illustrate embodiments of a battery assembly.

Still referring to FIG. 1, in some embodiments, pouch cell 100 may include second side of pouch cell 100. In some embodiments, the second side may include a vent. As used in this disclosure, a "vent" is a duct that allows air, gas, liquid, or solid to pass out of a confined space. As a non-limiting example, the confined space may include an aircraft, a battery pack, a battery module, a battery cell, and the like. In an embodiment, the battery pack may be a battery pack assembly disclosed with respect to FIG. 2. In another embodiment, the battery cell may include pouch cell 104. In some embodiments, the vent of pouch cell 104 may be configured to discharge cell ejecta from pouch cell 104.

Still referring to FIG. 1, in some embodiments, a vent may include a check valve. As used in this disclosure, a "check valve" is a valve that permits flow of a fluid only in certain, for example one, direction. In some embodiments, the check valve may be configured to allow for a flow path and/or fluid in substantially one direction. As a non-limiting example, the check valve may allow flow of fluids substantially only away from at least a pouch cell 104 while preventing back flow of vented fluid to at least a pouch cell 104. In another embodiment, the vent may include a duckbill valve. As used in this disclosure, a "duckbill valve" is a type of check valve that has lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. Additionally, without limitation, the vent disclosed herein may be consistent with a vent disclosed in U.S. patent application Ser. No. 17/983,664, filed on Nov. 9, 2022, entitled as "HEAT-DISSIPATING BATTERY PACK", which is incorporated in its entirety herein by reference.

Still referring to FIG. 1, in some embodiments, pouch 104 may contain an electrolyte. As used in this disclosure, an "electrolyte" is a substance that allows electrical current to flow between anode and cathode. In some embodiments, the anode and the cathode may be a pair of foil conductive foil tabs 108. In some embodiments, the electrolyte may contact one or both of a pair of foil conductive foil tabs 108. In some embodiments, the electrolyte may include a gel, such as a lithium polymer. In some embodiments, the electrolyte may include a wet paste. In some embodiments, the electrolyte may include a liquid such as, for example a liquid containing lithium salts (e.g. $LiPF_6$, $LiBF_4$, $LiClO_4$). In some embodiments, these lithium salts may be in an organic solvent, such as, for example, ethylene carbonate, dimethyl carbonate, or diethyl carbonate. In some embodiments, the electrolyte may contain solids. In these embodiments, as a non-limiting example, the electrolyte may include lithium metal oxides. In some embodiments, the electrolyte may include an inorganic compound, such as but not limited to ammonium chloride, zinc chloride, and the like. In some embodiments, the electrolyte may include liquid acid. In some embodiments, electrolyte is an alkaline solution. In some embodiments, the electrolyte may be in dry format.

Still referring to FIG. 1, additionally without limitation, pouch cell 104 may be consistent with any pouch cell disclosed in U.S. patent application Ser. No. 17/839,887, filed in Jun. 14, 2022, entitled as "BATTERY PACK FOR A CARBON FIBER POUCH CELL CASING CONFIGURED TO COOL BATTERY CELLS," which is incorporated in its entirety herein by reference.

Still referring to FIG. 1, in some embodiments, battery assembly 100 may include a battery cell case. In some embodiments, the battery cell case may be configured to surround a plurality of the at least a battery cell such as without limitation first pouch cell 104a and second pouch cell 104b. In some embodiments, the battery cell case may include a convex shape on one or more faces. A convex shape may be configured to allow the battery cell case to compress. In some embodiments, the battery cell case may include a prismatic shape, such as a P-type battery cell assembly. In some embodiments, the battery cell case may include one or more mounting points. A mounting point may be configured to connect a battery assembly to another battery assembly. In some embodiments, the battery cell case may be configured to stack the plurality of the at least a battery cell. In some embodiments, an arrangement may include a stacked arrangement, a staggered arrangement, and the like. In some embodiments, two or more the at least a battery cell may be stacked on top of one another. In some embodiments, the battery cell case may include a polymer enclosure. As used in this disclosure, a "polymer enclosure" is an area surrounded by a polymer. In some embodiments, the polymer enclosure may encapsulate individual of the plurality of the at least a battery cell. In some embodiments, the polymer enclosure may encapsulate the plurality of the at least a battery cell. In some embodiments, the polymer enclosure may be wrapped around one or more the at least a battery cell. In some embodiments, the polymer enclosure may be folded at one or more ends of one or more battery cells. In some embodiments, an adhesive may be positioned on the polymer enclosure. An adhesive may be configured to secure a portion of the polymer enclosure in place. In a non-limiting example, the polymer enclosure may be folded at an end of a battery cell. An adhesive strip may be placed at the folded end to keep the folded end secured. In some embodiments, the polymer enclosure may include a polymer, such as, but not limited to, a carbon fiber. In some embodiments, a prismatic battery cell case may include an outer structure. An outer structure may include a layer of insulating material on a first side of the outer structure and on a second side of the outer structure. In some embodiments, an insulating material may include a foam and/or carbon fiber material.

Still referring to FIG. 1, in some embodiments, a battery cell case may include a carbon fiber. In some embodiments, the battery cell case may include a lithophobic carbon fiber. As used in this disclosure, a "carbon fiber element" is a material and/or object comprising an element of carbon. For example and without limitation, carbon fiber element may include one or more carbon fiber sheets, carbon fiber supported metals, carbon fiber bands, and the like thereof. In an embodiment, and without limitation, carbon fiber element may include one or more carbon fibers comprising 6-20 micrometers in diameter. In another embodiment, and without limitation, carbon fiber element may comprise high stiffness, high tensile strength, low weight to strength ratio, high chemical resistance, high temperature tolerance, and/or low thermal expansion. In an embodiment, and without limitation, carbon fiber element may include one or more composites such as a plastic resin, polymer, graphite, and the like thereof.

Still referring to FIG. 1, in some embodiments, battery assembly 100 may include a layer. In some embodiments, battery cell case may include the layer. As used in this disclosure, a "layer" as used in this disclosure, is a barrier and/or layer of material and/or object that is placed additionally to an element. As a non-limiting example, the element may be at least a battery cell such as without limitation pouch cell 104. In some embodiments, the layer may be placed in between a plurality of the at least a battery cell. As a non-limiting example, the layer may be placed in between bottom surface 120 of first pouch cell 104a and top surface 116 of second pouch cell 104b. In some embodiments, the layer may be placed in between the at least a battery cell and a battery cell case. As a non-limiting example, the layer may be placed in between pouch cell 104 and a polymer enclosure. In some embodiments, the battery cell case may include a plurality of layers. In an embodiment, the battery cell case may include same type of the plurality of layers. In another embodiment, the battery cell case may include different types of the plurality of layers. Additionally, without limitation, the layer disclosed herein may be consistent with an insulative barrier found in U.S. patent application Ser. No. 17/983,721, filed on Nov. 9, 2022, entitled as "BATTERY PACK FOR AN ELECTRIC AIRCRAFT," which is incorporated in its entirety herein by reference.

Still referring to FIG. 1, in some embodiments, foam layer 124 is configured to provide a pressure against the at least a battery cell. As a non-limiting example, the pressure may include 5 psi, 10 psi, 12 psi, 39 psi, 54 psi, 60 psi, 75 psi, 80 psi, 120 psi, and the like. In an embodiment, the pressure against the at least a battery cell may be less than 120 psi. In another embodiment, the pressure against the at least a battery cell may be greater than 120 psi. In some embodiments, due to the added pressure by placing foam layer 124 in the battery cell case, life cycle of the at least a battery cell may improve. As used in this disclosure, "life cycle" is the number of charge and discharge cycles that a battery can complete before losing performance. In some embodiments, life cycle of the at least a battery cell may include 1 cycle, 35 cycles, 100 cycles, 450 cycles, 1000 cycles, 4000 cycles and the like. As a non-limiting example, 400 cycles of pouch cell 104 may mean pouch cell 104 may be charged and discharged 400 times. In some embodiments, the life cycle of the at least a battery cell may improve by 5%, 10%, 20%, 50%, 100%, 200%, or the like.

Still referring to FIG. 1, in some embodiments, the layer may be configured to resist high temperature of at least a battery cell. In some embodiments, the layer may be configured to resist high temperature of the at least a battery cell experiencing a thermal runaway. In some embodiments, the layer may resist the temperature of the at least a battery cell such as without limitation 1000° C., 1200° C., 1600° C., 1800° C., and the like. In some embodiments, the layer may include a refractory material. As used in this disclosure, a "refractory material" is a material that is resistant to decomposition by heat, pressure, or chemical attack, and retains strength and form at high temperatures. As a non-limiting example, the layer may include mica, silica, firebrick, ceramic, and the like. In some embodiments, the layer may be thermally insulated. As used in this disclosure, "thermal insulation" is the reduction of heat transfer between objects in thermal contact or in range of radiative influence. As a non-limiting example, the layer thermally insulate first pouch cell 104a so that the layer may prevent second pouch cell 104b from experiencing a thermal runaway while first pouch cell 104a experiences the thermal runaway. In some embodiments, the layer may include silicone, silica insulator, fibrous matt of silica, aerogel, fiberglass, matrix for aerogel, powdered aerogel, and the like.

Still referring to FIG. 1, in some embodiments, the layer may include a phase change material. A "phase change material (PCM)," as used in this disclosure, is a substance which releases/absorbs sufficient energy at phase transition to provide useful heat or cooling. "Phase transitions", as used in this disclosure and also known as phase changes are the physical processes of transition between a state of a medium, identified by some parameters, and another one, with different values of the parameters. Commonly the term is used to refer to changes among the basic states of matter: solid, liquid, and gas, plasma, and the like. Alternatively or additionally, in some cases, coolant may include a solid (e.g., bulk material) and coolant flow may include motion of the solid. Exemplary forms of mechanical motion for bulk materials include fluidized flow, augers, conveyors, slumping, sliding, rolling, and the like. In some embodiments, the layer may include an exothermic phase change material. As used in this disclosure, an "exothermic phase change material" is a type of phase change material that releases heat at phase transition.

Still referring to FIG. 1, in some embodiment, the layer may be configured to resist high mechanical force. As a non-limiting example, the mechanical force may include abrasion by ejecta during a thermal runaway. As used in this disclosure, "abrasion" is the process of scraping or wearing something away. In some embodiments, the layer may include abrasion-resistant material. As used in this disclosure, "abrasion-resistant material" is a material that resist abrasion force. As a non-limiting example, the layer may include mica, ceramics, ceramic coatings, diamond-like carbon coating, silicon wafer, carbon fiber, graphite, and the like.

Still referring to FIG. 1, in some embodiments, the layer may include mica-faced silica mat insulation. As used in this disclosure, "mica-faced silica mat insulation" is a material with high temperature and abrasion resistance of mica with insulation properties of silica mat. In some embodiments, the layer may include a compliant material. As used in this disclosure, a "compliant material" is a material that has recognized, predictable and consistent properties. As a non-limiting example, the compliant material may include a foam, a woven mat, and the like. The compliant material may be configured to swell or extend with increased temperature so that it provides pressure against at least a battery cell. In some embodiments, without limitation, the compliant material may swell when the at least a battery cell is charging. In some embodiments, the layer may include a compliant material with a prescribed spring rate. As used in this disclosure, "spring rate" is a rate of any compressive, extensive and/or elastic material with an amount of force it takes to compress and/or extend the material by a proportionate amount. In some embodiments, the spring rate may be displaced a certain amount for the layer to achieve a desired force to the at least a battery cell.

Still referring to FIG. 1, in some embodiments, the layer may include foam layer 124. In some embodiments, foam layer 124 may be configured to provide thermal insulation to one or more battery cells of the battery assembly. In some embodiments, foam layer 124 may include a compression foam. In some embodiments, the compression foam may be configured to deflect and/or stack a plurality of battery cells. In some embodiments, foam layer 124 may be configured to expand with a battery cell during charge and life cycle of the at least a battery cell.

Still referring to FIG. 1, in some embodiments, a prismatic battery cell case may include two or more foam layers 124. In some embodiments, two or more foam layers 124 may be positioned anywhere and with any orientation in a prismatic battery cell case. In some embodiments, two or more foam layers 124 may be positioned at an end of a battery cell of a prismatic battery cell case. In some embodiments, two or more battery cells may include an arrangement. An arrangement may include a stacked arrangement, a staggered arrangement, and the like. In some embodiments, two or more battery cells may be stacked on top of one another. In some embodiments, a first cell of a battery cell case may include a dimension different than a second cell of the battery cell case. A battery cell case may be configured to hold two or more battery cells having different dimensions such as, but not limited to, height, width, thickness, length, diameter, and the like.

Still referring to FIG. 1, in other embodiments, a polymer enclosure may include a cooling member. A "cooling member" as used in this disclosure is any component that is capable of reducing a thermal energy of an object and/or group of objects. In some embodiments, a polymer enclosure may include a cooling member configured to be shared by two or more battery cells. A cooling member may include, but is not limited to, a heat sink, a vent, an insulation foam, and the like. In some embodiments, a battery cell case may be configured to direct ejecta from a thermal runaway. A battery cell case may utilize one or more layers as described above to direct an ejecta from one or more battery cells away from the battery cell case.

Still referring to FIG. 1, in some embodiments, a layer may include a polymer layer. A polymer layer may be configured to direct an ejecta from one battery cell of the battery assembly away from a neighboring battery cell of the battery assembly. In some embodiments, a polymer layer may include a carbon fiber. A plurality of layers may include a resin layer. A resin layer may be configured to absorb molten substances from one or more battery cells of the battery assembly. In some embodiments, a resin layer may include polyether ether ketone (PEEK) resin. A resin layer may be configured to wick away and/or absorb molten lithium from one or more battery cells. In some embodiments, a resin layer may include an ablating resin.

Still referring to FIG. 1, in some embodiments, a layer may include composite layer 128. A "composite layer" as used in this disclosure is a combination of two or more layers. In some embodiments, a battery cell case may include composite layer 128. In some embodiments, at least a portion of the battery cell case may include composite layer 128. In some embodiments, a battery assembly 100 may include composite layer 128 including a polymer and resin layer. In some embodiments, a battery assembly may include composite layer 128 including any combination of layers. In some embodiments, composite layer 128 is configured to direct an ejecta from the at least a battery cell away from other battery cells. In some embodiments, composite layer 128 may be configured to absorb a molten substance from the at least a battery cell, wherein the molten substance is a resultant of a thermal runaway of the at least a battery cell.

Still referring to FIG. 1, in some embodiments, a battery assembly may include a cell pitch. As used in this disclosure, a "cell pitch" is a height of a battery cell. In some embodiments, the cell pitch of at least a battery cell may include a dimension of 9.17 mm. In some embodiments, a battery assembly may include a specific energy. As used in this disclosure, "specific energy" is energy of a battery cell per unit mass of the battery cell. In some embodiments, the specific energy of the at least a battery cell may be between 100-400 Wh/lg. In some embodiments, the specific energy of the at least a battery cell may include 329.7 Wh/kg. In some embodiments, a battery assembly may include an energy density. As used in this disclosure, "energy density" is the amount of energy that can be stored in a battery cell per unit volume of the battery cell. In some embodiments, the energy density of the at least a battery cell may include between 100-500 Wh/L. In some embodiments, the energy density of the at least a battery cell may include 397.65 Wh/L.

Referring now to FIG. 2A, a battery assembly is shown. A battery assemblies may include battery cells. Battery cells may each comprise a cell configured to include an electrochemical reaction that may produce electrical energy sufficient to power at least a portion of an electric aircraft. Battery cells may include, but are not limited to, electrochemical cells, galvanic cells, electrolytic cells, fuel cells, flow cells, voltaic cells, or any combination thereof. In some embodiments, battery cells may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells may use the term 'wired', but one of ordinary skill in the art would appreciate that this term is synonymous with 'electrically connected', and that there are many ways to couple electrical elements like battery cells together. As an example, battery cells may be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in any arrangement which may confer onto the system the electrical advantages associated with that arrangement such as high-voltage applications, high-current applications, or the like.

Still referring to FIG. 2A, as used herein, an "electrochemical cell" is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other. In some embodiments, battery cells may include pouch cells. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, a pouch may be substantially rigid. In some cases, a pouch may include a polymer, such as without limitation polyethylene, acrylic, polyester, and the like. In some embodiments, a pouch may be coated with one or more coatings. For example, in some cases, a pouch may have an outer surface. In some embodiments, an outer surface may be coated with a metalizing coating, such as an aluminum or nickel containing coating. In some embodiments, a pouch coating may be configured to electrically ground and/or isolate pouch, increase pouch impermeability, increase pouches resistance to heat, increases pouches thermal resistance (insulation), and the like. An electrolyte may be located in a pouch. In some embodiments, an electrolyte may include a liquid, a solid, a gel, a paste, and/or a polymer. In some embodiments, an electrolyte may include a lithium salt such as LiPF6. In some embodiments, a lithium salt may include lithium hexafluorophosphate, lithium tetrafluoroborate, lithium perchlorate, or other lithium salts. In some embodiments, a lithium salt may include an organic solvent. In some embodiments, an organic solvent may include ethylene carbonate, dimethyl carbonate, diethyl carbonate or other organic solvents. In some embodiments, an electrolyte may wet or contact one or both of a pair of conductive foil tabs of a battery cell. In some embodiments, each battery cell of battery cells 208 may include a conductive tab that may extrude from a side of the battery cell. In some embodiments, a conductive tab may extrude from a bottom, side, rear, top, or front surface of a battery cell of battery cells 208.

Still referring to FIG. 2A, battery cells may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Battery cells may include lead-based batteries such as without limitation lead acid batteries and lead carbon batteries. Battery cells may include lithium sulfur batteries, magnesium ion batteries, and/or sodium ion batteries. Battery cells may include solid state batteries or supercapacitors or another suitable energy source. Persons skilled in the art, upon reviewing the entirety of this disclosure, will be aware of various devices of components that may be used as a battery cell.

Still referring to FIG. 2A, a battery assembly may include a sensor. A sensor may be coupled to battery cells. In some embodiments, a sensor may be mechanically and/or electrically coupled to battery cells. A sensor may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery cells measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a system and/or a user to detect phenomenon is maintained and in a non-limiting example, a user alter aircraft usage pursuant to sensor readings.

Still referring to FIG. 2A, a sensor may include a humidity sensor. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A humidity sensor may include a psychrometer. A humidity sensor may include a hygrometer. A humidity sensor may be configured to act as or include a humidistat. A "humidistat", for the purposes of this disclosure, is a humidity-triggered switch, often used to control another electronic device. A humidity sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

Still referring to FIG. 2A, a sensor may include a multimeter. A multimeter may be configured to measure voltage across a component, electrical current through a component, and resistance of a component. A multimeter may include separate sensors to measure each of the previously disclosed electrical characteristics such as voltmeter, ammeter, and ohmmeter, respectively.

Alternatively or additionally, and Still referring to FIG. 2A, a sensor may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. A sensor and/or a control circuit incorporated therein and/or communicatively connected thereto may be configured to adjust charge to one or more battery cells as a function of a charge level and/or a detected parameter. For instance, and without limitation, a sensor may be configured to determine that a charge level of a battery cell is high based on a detected voltage level of that battery cell or portion of the battery pack. A sensor may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. A sensor may include digital sensors, analog sensors, or a combination thereof. A sensor may include digital-to-analog converters (DAC), analog-to-digital converters (ADC, A/D, A-to-D), a combination thereof.

Still referring to FIG. 2A, a sensor may include thermocouples, thermistors, thermometers, passive infrared sensors, resistance temperature sensors (RTD's), semiconductor based integrated circuits (IC), a combination thereof or another undisclosed sensor type, alone or in combination. Temperature, as measured by any number or combinations of sensors present within a sensor, may be measured in Fahrenheit (° F.), Celsius (° C.), Kelvin (° K), or another scale alone or in combination. A temperature measured by sensors may comprise electrical signals which are transmitted to their appropriate destination wireless or through a wired connection.

Still referring to FIG. 2A, a sensor may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of catastrophic cell failure may include gaseous discharge including oxygen, hydrogen, carbon dioxide, methane, carbon monoxide, a combination thereof, or another undisclosed gas, alone or in combination. Further, a sensor may be configured to detect vent gas from electrochemical cells that may comprise a gas detector. For the purposes of this disclosure, a "gas detector" is a device used to detect a gas is present in an area. Gas detectors, and more specifically, the gas sensor that may be used in a sensor, may be configured to detect combustible, flammable, toxic, oxygen depleted, a combination thereof, or another type of gas alone or in combination. A gas sensor that may be present in a sensor may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. A sensor may include sensors that are configured to detect non-gaseous byproducts of catastrophic cell failure including, in non-limiting examples, liquid chemical leaks including aqueous alkaline solution, ionomer, molten phosphoric acid, liquid electrolytes with redox shuttle and ionomer, and salt water, among others. A sensor may include sensors that are configured to detect non-gaseous byproducts of catastrophic cell failure including, in non-limiting examples, electrical anomalies as detected by any of the previous disclosed sensors or components.

Referring still to FIG. 2A, a battery assembly for a plurality of battery cells is shown. In some embodiments, a battery assembly may include a pair of conductive foil tabs 108. In some embodiments, a battery assembly may include a four cell P block type assembly. In some embodiments, a battery assembly may be configured to hold one or more pouch cells in a prismatic cell configuration. A prismatic cell configuration may reduce a volume occupancy of a plurality of pouch cells. A prismatic cell configured may increase a stacking ability of one or more pouch cells. In some embodiments, a battery assembly may be configured to act like a prismatic battery cell assembly while using pouch cells. A battery assembly may include a polymer enclosure. In some embodiments, a polymer enclosure may be configured to surround at least a portion of a battery cell. In some embodiments, a polymer enclosure may be configured to surround multiple battery cells. A polymer enclosure may include a type of case. In some embodiments, a polymer enclosure may include a plurality of layers. A plurality of layers may include a polymer layer. A polymer layer may be configured to direct an ejecta from one battery cell of the battery assembly away from a neighboring battery cell of the battery assembly. In some embodiments, a polymer layer may include a carbon fiber. A plurality of layers may include a resin layer. A resin layer may be configured to absorb molten substances from one or more battery cells of the battery assembly. In some embodiments, a resin layer may include polyether ether ketone (PEEK) resin. A resin layer may be configured to wick away and/or absorb molten lithium from one or more battery cells. In some embodiments, a polymer enclosure may include foam layer 124. Foam layer 124 may be configured to provide thermal insulation to one or more battery cells of the battery assembly. In some embodiments, a foam layer may be a compression foam. A compression foam may be configured to deflect and/or stack a plurality of battery cells. In some embodiments, foam layer 124 may be configured to expand with a battery cell during charge and life cycle of the cell. In some embodiments, a battery assembly may include composite layer 128. In some embodiments, a battery assembly may include a composite layer including a polymer and resin layer. In some embodiments, a battery assembly may include composite layer 128 including any combination of layers. Additionally without limitation, any layer disclosed herein may be consistent with a layer disclosed with respect to FIG. 1.

Still referring to FIG. 2A, in some embodiments, a battery assembly may include a cell pitch. A cell pitch may include a dimension of 9.17 mm. In some embodiments, a battery assembly may include a specific energy. A specific energy may be between 100-400 Wh/lg. In some embodiments, a specific energy may include 329.7 Wh/kg. In some embodiments, a battery assembly may include an energy density. An energy density may include between 100-500 Wh/L. In some embodiments, an energy density may include 397.65 Wh/L. In some embodiments, a polymer enclosure may include a lithophobic carbon fiber. In some embodiments, a resin layer may include an ablating resin. In some embodiments, a polymer enclosure may include a convex shape on one or more faces. A convex shape may be configured to allow a polymer enclosure to compress. In some embodiments, a polymer enclosure may include a prismatic shape, such as a P-type battery cell assembly. In some embodiments, a polymer enclosure may include one or more mounting points. A mounting point may be configured to connect a battery assembly to another battery assembly.

Figure 2B:
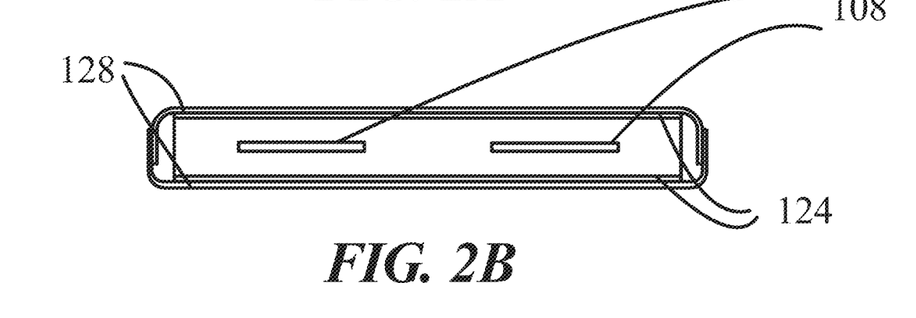

Referring now to FIG. 2B, a single cell case type battery assembly is shown. A single cell case type battery assembly may include a plurality of layers. A plurality of layers may include, but is not limited to, a polymer layer, a resin layer, and/or a foam layer. A polymer layer may include a lithophobic material. In some embodiments, a polymer layer may include a litohphobic matrix. A "lithophobic matrix" as used in this disclosure is an array of one or more lithophobic elements. In some embodiments, a polymer layer may include a carbon fiber. A polymer layer may be configured to repel and/or direct ejecta away from a single battery cell. In some embodiments, a resin layer may comprise, but is not limited to, ablating resin, DP 420 VO, or other resin layers. A resin layer may be configured to wick away molten substances from a single battery cell, such as molten lithium and/or other molten substances. In some embodiments, a foam layer may be configured to allow a single cell to expand in a single cell case. A single cell may expand, grow, shrink, and the like over the cell's lifecycle. A foam layer may support a changing physical structure of a single cell. In some embodiments, a foam layer may add compression to a single cell. Compression added to a single cell may prevent the single cell from taking on an undesirable shape. A single cell case battery assembly may include a polymer enclosure and layers as described in FIG. 2A.

Figure 3:
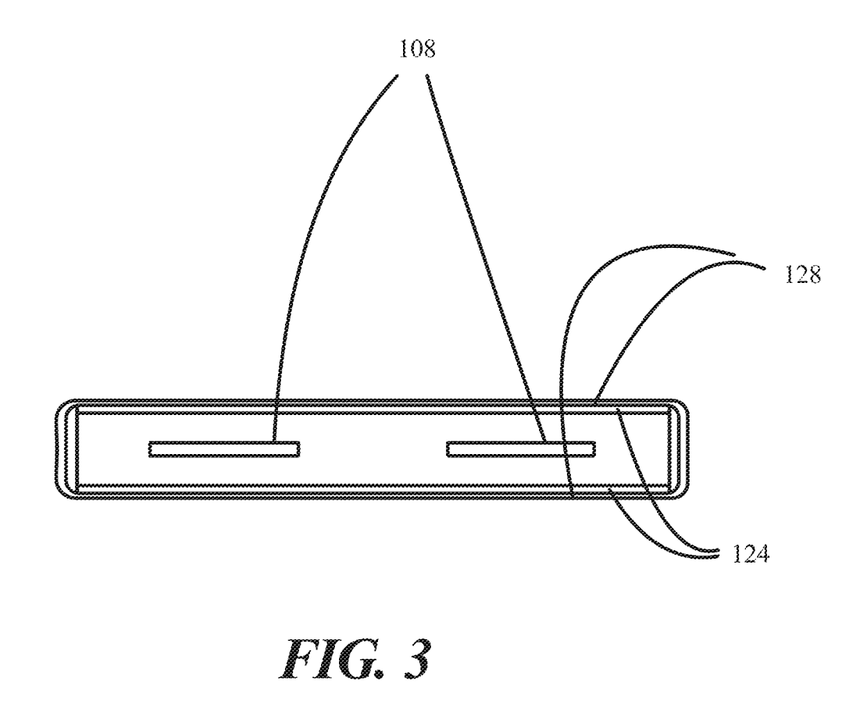
FIG. 3 illustrate a top view of an exemplary single battery assembly.

Referring now to FIG. 3, a top view of a single cell battery assembly is shown. A single cell battery assembly may include a lithium ion battery cell. In some embodiments, a single cell battery assembly may include a pouch cell. In some embodiments, a single cell battery assembly may include a plurality of layers. In some embodiments, the plurality of layers may include foam layer 124. In some embodiments, the plurality of layers may include composite layer 128. A plurality of layers may encapsulate a single battery cell. A single cell battery assembly may include one or more conductive foil tabs 108. A single cell battery assembly may be as described in FIGS. 2A-B.

Figure 4:
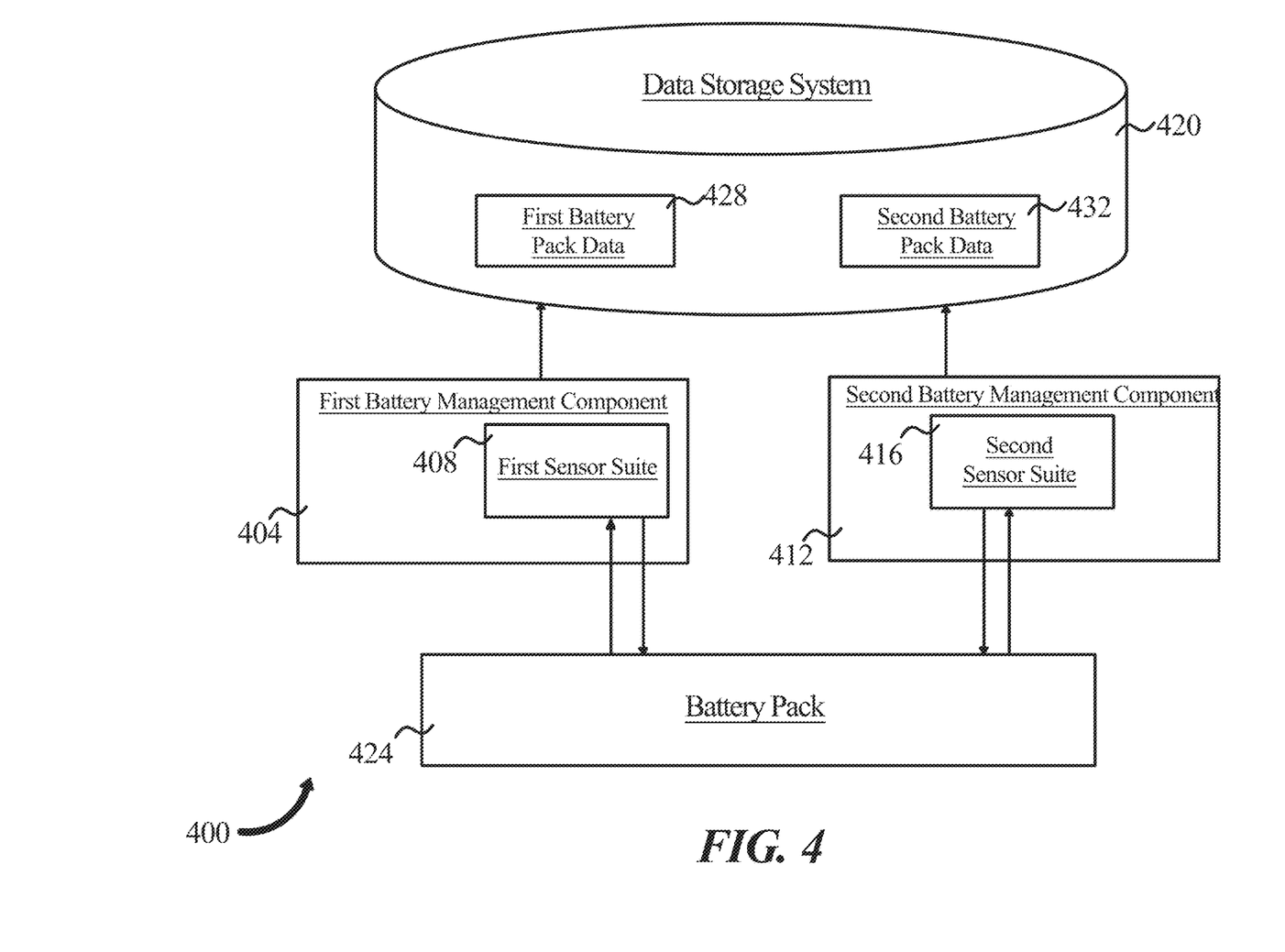
FIG. 4 is a block diagram of an exemplary embodiment of a battery management system.

Referring now to FIG. 4, an embodiment of battery management component system 400 is presented. Battery management system 400 may be integrated in battery pack 424 which may be configured for use in an electric aircraft. Battery management system 400 may be integrated in a portion of battery pack 424 or subassembly thereof. Battery management system 400 may include first battery management component 404 disposed on a first end of battery pack 424. One of ordinary skill in the art will appreciate that there are various areas in and on battery pack 424 and/or subassemblies thereof that may include first battery management component 404. First battery management component 404 may take any suitable form. In a non-limiting embodiment, first battery management component 404 may include a circuit board, such as a printed circuit board and/or integrated circuit board, a subassembly mechanically coupled to at least a portion of battery pack 424, standalone components communicatively coupled together, or another undisclosed arrangement of components; for instance, and without limitation, a number of components of first battery management component 404 may be soldered or otherwise electrically connected to a circuit board. First battery management component 404 may be disposed directly over, adjacent to, facing, and/or near a battery module and specifically at least a portion of a battery cell. First battery management component 404 may include first sensor suite 408. First sensor suite 408 may be configured to measure, detect, sense, and transmit first plurality of battery pack data 428 to data storage system 420.

Referring again to FIG. 4, battery management system 400 may include second battery management component 412. Second battery management component 412 may be disposed in or on a second end of battery pack 424. Second battery management component 412 may include second sensor suite 416. Second sensor suite 416 may be consistent with the description of any sensor suite disclosed herein. Second sensor suite 416 may be configured to measure second plurality of battery pack data 432. Second plurality of battery pack data 432 may be consistent with the description of any battery pack data disclosed herein. Second plurality of battery pack data 432 may additionally or alternatively include data not measured or recorded in another section of battery management system 400. Second plurality of battery pack data 432 may be communicated to additional or alternate systems to which it is communicatively coupled. Second sensor suite 416 may include a humidity sensor.

Still referring to FIG. 4, first battery management component 404 may be disposed in or on battery pack 424 may be physically isolated from second battery management component 412 also disposed on or in battery pack 424. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management component 404 and second battery management component 408 may perform the same or different functions in battery management system 400. In a non-limiting embodiment, first battery management component 404 and second battery management component 412 may perform the same, and therefore redundant functions. If, for example, first battery management component 404 malfunctions, in whole or in part, second battery management component 412 may still be operating properly and therefore battery management system 400 may still operate and function properly for electric aircraft in which it is installed. Additionally or alternatively, second battery management component 412 may power on while first battery management component 404 is malfunctioning. One of ordinary skill in the art would understand that the terms "first" and "second" do not refer to either "battery management components" as primary or secondary. In non-limiting embodiments, first battery management component 404 and second battery management component 412 may be powered on and operate through the same ground operations of an electric aircraft and through the same flight envelope of an electric aircraft. This does not preclude one battery management component, first battery management component 404, from taking over for second battery management component 412 if it were to malfunction. In non-limiting embodiments, first battery management component 404 and second battery management component 412, due to their physical isolation, may be configured to withstand malfunctions or failures in the other system and survive and operate. Provisions may be made to shield first battery management component 404 from second battery management component 412 other than physical location such as structures and circuit fuses. In non-limiting embodiments, first battery management component 404, second battery management component 412, or subcomponents thereof may be disposed on an internal component or set of components within battery pack 424, such as on a battery module sense board.

Referring again to FIG. 4, first battery management component 404 may be electrically isolated from second battery management component 412. "Electrical isolation", for the purposes of this disclosure, refer to a first system's separation of components carrying electrical signals or electrical energy from a second system's components. First battery management component 404 may suffer an electrical catastrophe, rendering it inoperable, and due to electrical isolation, second battery management component 412 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of first battery management component 404 and second battery management component 412 preventing electrical energy to be conducted through it, isolating first battery management component 404 and second battery management 412 from each other.

Still referring to FIG. 4, battery management system 400 may include data storage system 420. Data storage system 420 may be configured to store first plurality of battery pack data 428 and second plurality of battery pack data 432. Data storage system 420 may include a database. Data storage system 420 may include a solid-state memory or tape hard drive. Data storage system 420 may be communicatively coupled to first battery management component 404 and second battery management component 412 and may be configured to receive electrical signals related to physical or electrical phenomenon measured and store those electrical signals as first battery pack data 428 and second battery pack data 432, respectively. Alternatively, data storage system 420 may include more than one discrete data storage systems that are physically and electrically isolated from each other. In this non-limiting embodiment, each of first battery management component 404 and second battery management component 412 may store first battery pack data 428 and second battery pack data 432 separately. One of ordinary skill in the art would understand the virtually limitless arrangements of data stores with which battery management system 400 could employ to store the first and second plurality of battery pack data.

Referring again to FIG. 4, data storage system 420 may store first plurality of battery pack data 428 and second plurality of battery pack data 432. First plurality of battery pack data 428 and second plurality of battery pack data 432 may include total flight hours that battery pack 424 and/or electric aircraft have been operating. First plurality of battery pack data 428 and second plurality of battery pack data 432 may include total energy flowed through battery pack 424. Data storage system 420 may be communicatively coupled to sensors that detect, measure and store energy in a plurality of measurements which may include current, voltage, resistance, impedance, coulombs, watts, temperature, or a combination thereof. Additionally or alternatively, data storage system 420 may be communicatively coupled to a sensor suite consistent with this disclosure to measure physical and/or electrical characteristics. Data storage system 420 may be configured to store first battery pack data 428 and second battery pack data 432 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 420 may store the first and second battery pack data that includes an upper voltage threshold and lower voltage threshold consistent with this disclosure. First battery pack data 428 and second battery pack data 432 may include a moisture level threshold. The moisture level threshold may include an absolute, relative, and/or specific moisture level threshold. In some embodiments, battery management system 400 may be as described in U.S. patent application Ser. No. 17/108,798, filed Dec. 1, 2020, and titled "SYSTEMS AND METHODS FOR A BATTERY MANAGEMENT SYSTEM INTEGRATED IN A BATTERY PACK CONFIGURED FOR USE IN ELECTRIC AIRCRAFT", of which is incorporated by reference herein in its entirety.

Figure 5:
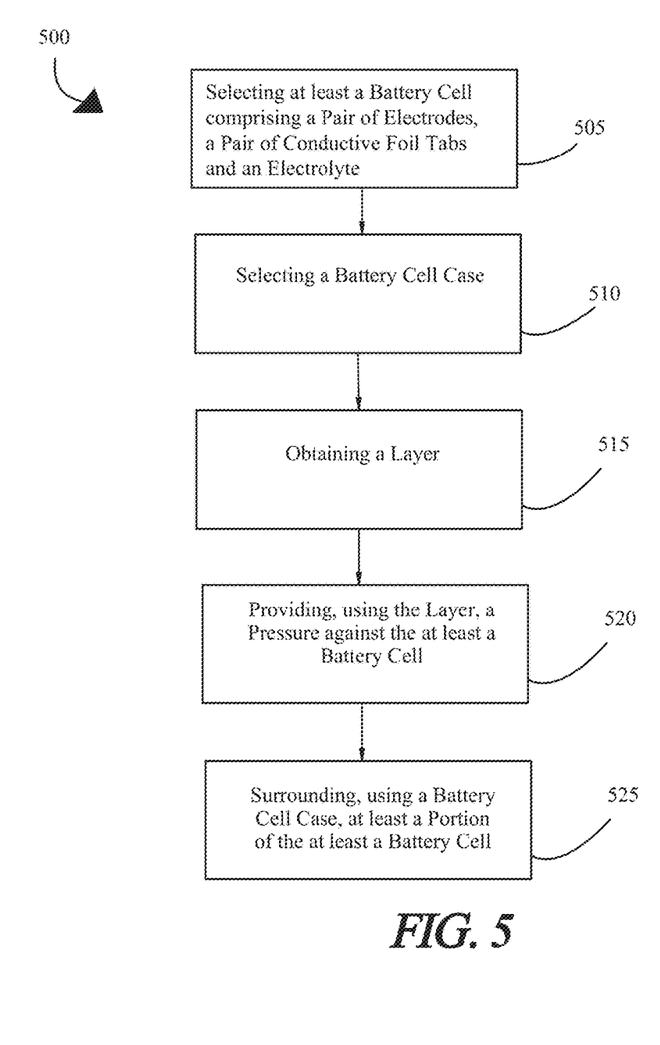
FIG. 5 is a flowchart of a method of manufacturing a battery assembly.

Now referring to FIG. 5, a flow diagram of an exemplary method 500 of manufacturing a battery pack assembly for use in an electric aircraft is illustrated. In some embodiments, method 500 may include step 505 selecting at least a battery cell comprising a pair of electrodes, a pair of conductive foil tabs and an electrolyte. In some embodiments, the at least a battery cell may include a pouch cell, wherein the pouch cell comprises a pouch. This may be implemented as disclosed with reference to FIG. 1-4.

Still referring to FIG. 5, in some embodiments, method 500 may include step 510 of selecting a battery cell case. In some embodiments, the battery cell case may include a carbon fiber. In some embodiments, the battery cell case may include a convex surface. This may be implemented as disclosed with reference to FIG. 1-4.

Still referring to FIG. 5, in some embodiments, method 500 may include step 515 of obtaining a layer. In some embodiments, the layer may include a composite layer. In some embodiments, method 500 may further include directing, using the composite layer, an ejecta from the at least a battery cell away from other battery cells and absorbing, using the composite layer, a molten substance from the at least a battery cell. In some embodiments, the layer may include mica-faced silica mat insulation. This may be implemented as disclosed with reference to FIG. 1-4.

Still referring to FIG. 5, in some embodiments, method 500 may include step 520 of providing, using the layer, a pressure against the at least a battery cell. In some embodiments, the layer comprises a foam layer. In some embodiments, method 500 may further include providing, using the foam layer, thermal insulation to the at least a battery cell.

In some embodiments, the layer is a compliant material. In some embodiments, the at least a battery cell may include a plurality of the at least a battery cell, wherein the layer is further configured to separate each of the plurality of the at least a battery cell. This may be implemented as disclosed with reference to FIG. 1-4.

Still referring to FIG. 5, in some embodiments, method 500 may include step 525 of surrounding, using a battery cell case, at least a portion of the at least a battery cell. This may be implemented as disclosed with reference to FIG. 1-4.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A battery pack assembly for use in an electric aircraft, wherein the battery pack assembly comprises:
    at least a battery cell, wherein the battery cell comprises:
        a pair of electrodes;
        a pair of conductive foil tabs; and
        an electrolyte; and
    at least a sensor coupled to the at least a battery cell, the at least a sensor configured to measure physical and electrical parameters of the at least a battery cell;
    a battery cell case, wherein the battery cell case is configured to surround at least a portion of the at least a battery cell, wherein the battery cell case comprises a composite layer, wherein the composite layer comprises a compression foam layer and a resin layer, wherein the composite layer is disposed between the at least a battery cell and configured to provide a pressure against and separate each of the at least a battery cell and wherein the battery cell case comprises a polymer enclosure including a cooling member comprising a vent allowing for a flow path of fluid in one direction.

2. The battery pack assembly of claim 1, wherein the at least a battery cell comprises a pouch cell, wherein the pouch cell comprises a pouch.

3. The battery pack assembly of claim 1, wherein the composite layer comprises a polymer layer.

4. The battery pack assembly of claim 1, wherein the composite layer is configured to:
    direct an ejecta from the at least a battery cell away from other battery cells; and
    absorb a molten substance from the at least a battery cell.

5. The battery pack assembly of claim 1, wherein the pressure foam layer is configured to provide thermal insulation to the at least a battery cell.

6. The battery pack assembly of claim 1, wherein the composite layer comprises a compliant material.

7. The battery pack assembly of claim 1, wherein the composite layer comprises mica-faced silica mat insulation.

8. The battery pack assembly of claim 1, wherein the at least a battery cell comprises a plurality of the at least a battery cell.

9. The battery pack assembly of claim 1, wherein the battery cell case comprises carbon fiber.

10. The battery pack assembly of claim 1, wherein the battery cell case comprises a convex surface.

11. A method of manufacturing a battery pack assembly for use in an electric aircraft, comprising:
    selecting at least a battery cell comprising a pair of electrodes, a pair of conductive foil tabs and an electrolyte;
    coupling at least a sensor to the at least a battery cell, the at least a sensor configured to measure physical and electrical parameters of the at least a battery cell;
    selecting a battery cell case;
    obtaining a composite layer, wherein the composite layer comprises a compression foam layer and a resin layer;
    positioning the composite layer between the at least a battery cell configured to separate each of the at least a battery cell;
    providing, using the composite layer, a pressure against the at least a battery cell; and
    surrounding, using a battery cell case, at least a portion of the at least a battery cell and the composite layer, wherein the battery cell case comprises a polymer enclosure including a cooling member comprising a vent allowing for a flow path of fluid in one direction.

12. The method of claim 11, wherein the composite layer comprises a polymer layer.

13. The method of claim 11, further comprising:
    directing, using the composite layer, an ejecta from the at least a battery cell away from other battery cells; and
    absorbing, using the composite layer, a molten substance from the at least a battery cell.

14. The method of claim 11, further comprising:
    providing, using the pressure foam layer, thermal insulation to the at least a battery cell.

15. The method of claim 11, wherein the composite layer is a compliant material.

16. The method of claim 11, wherein the composite layer comprises mica-faced silica mat insulation.

17. The method of claim 11, wherein the battery cell case comprises a carbon fiber.

18. The method of claim 11, wherein the at least a battery cell comprises a plurality of the at least a battery cell.

19. The battery pack assembly of claim 1, wherein the resin layer is located between two compression layers.

20. The method of claim 11, wherein the resin layer is located between two compression layers.

* * * * *